United States Patent [19]

Braun et al.

[11] 4,325,861
[45] Apr. 20, 1982

[54] RAPIDLY DISSOLVED WATER-SOLUBLE POLYMER COMPOSITION

[75] Inventors: David B. Braun, Ridgefield, Conn.; Meyer R. Rosen, Spring Valley, N.Y.

[73] Assignee: Union Carbide Corporation, New York, N.Y.

[21] Appl. No.: 136,762

[22] Filed: Apr. 3, 1980

Related U.S. Application Data

[63] Continuation-in-part of Ser. No. 856,980, Dec. 2, 1977, abandoned.

[51] Int. Cl.$^3$ ................................................ C08K 5/01
[52] U.S. Cl. ................................... 523/205; 106/191; 524/37; 524/38; 524/41
[58] Field of Search .................. 260/29.6 PM, 29.6 H, 260/33.2 R, 33.6 R, 33.6 UA; 106/191

[56] References Cited

U.S. PATENT DOCUMENTS

| | | | |
|---|---|---|---|
| 3,167,519 | 1/1965 | Hill | 260/2 A |
| 3,624,019 | 11/1971 | Anderson | 260/29.6 H |
| 3,657,182 | 4/1972 | Jolly | 260/33.4 R |
| 3,736,288 | 5/1973 | Stratta | 260/33.4 R |
| 3,888,945 | 6/1975 | Arndt | 260/29.6 PM |
| 4,029,622 | 6/1977 | Keller | 260/29.6 WQ |
| 4,052,353 | 10/1977 | Scanley | 260/33.6 UA |

FOREIGN PATENT DOCUMENTS 1397933  6/1975  United Kingdom .

*Primary Examiner*—Paul R. Michl
*Attorney, Agent, or Firm*—Gary L. Wamer

[57] ABSTRACT

Water-soluble polymers are rapidly dissolved by employing a concentrate of (i) a water-soluble particulate polymer, (ii) a water-insoluble organic vehicle which is a non-solvent for the polymer, (iii) a nonionic surfactant agent having an HLB in the ranges of 3–5 and 9–13 and if necessary, a thickening agent.

29 Claims, No Drawings

RAPIDLY DISSOLVED WATER-SOLUBLE POLYMER COMPOSITION

RELATED APPLICATION

This application is a continuation-in-part of U.S. Ser. No. 856,980, filed Dec. 2, 1977 now abandoned. This application is related to commonly assigned application Ser. No. 856,979 now U.S. Pat. No. 4,171,337.

This invention relates to rapidly dissolved water-soluble polymer compositions, and, in particular to particulate ethylene oxide polymer compositions and slurries which, upon dilution with water, quickly dissolve without agglomeration.

Water-soluble polymers, particularly of relatively high molecular weight, have been put to many highly beneficial uses in recent times. There exists a widespread demand for such polymers as thickeners for water-based paints, as foam stabilizers in beer, as binders for tablet-making, as protective colloids for emulsion polymerization, as dyeability enhancers for fabrics, and as thickening agents for foods and the like. Unfortunately such polymers can be quite difficult to dissolve in water. Poly(ethylene oxide) is typical of such materials, since the dry powder has a tendency to clump easily, when rapidly added to water. Although some improvement results by utilizing a slow addition of the polymer to water, clumping tendencies nevertheless still exist, making this technique undesirable. The clumps usually consist of a wet, sticky outer surface surrounding a dry powder center. Once formed, these clumps are difficult, if not impossible, to dissolve.

In the past, various proposals have been put forth for providing vehicles to aid in dispersing water-soluble polymers and to produce slurries having improved flow properties for better handling. For example, in U.S. Pat. Nos. 3,736,288 and 3,843,589 a water-soluble polymer has been dispersed in a water miscible or water-soluble vehicle. An emulsifier had been employed to reduce the viscosity of the slurry for better handling. While such systems have found widespread acceptance, the water-soluble or miscible vehicles employed can be expensive, as compared to other vehicles, such as petroleum based hydrocarbons. In addition, the emulsifiers employed in these systems were of the silicone or organic species and were merely selected to improve the handling characteristics of the slurry system by increasing fluidity.

It has been suggested that water-soluble polymers could be employed with hydrophobic vehicles, such as kerosene, together with a thickener to form "so-called" drag-reducing slurries which are useful for facilitating loading and handling large quantities of polymer. No emulsifiers were suggested for this system. However, use of such hydrophobic vehicles produced particularly viscous slurries, difficult to dissolve in water compared to the preferred water-miscible or water-soluble vehicles.

In U.S. Pat. No. 4,010,135 a method for dissolving water-soluble polymers is disclosed. Polymers are combined with a water-soluble binding agent and a salt. An alternate method for dispersing a water-soluble polymer is illustrated in U.S. Pat. No. 3,624,019. A water-in-oil emulsion is prepared. An emulsifier bridges the water and surrounding oil. On dissolution in water, the emulsion inverts, freeing the polymer to dissolve in the water. The emulsion liquids are water and oil. The emulsifier is merely selected to disperse the water droplets in oil.

Another concentrate for dispersing a water-soluble polymer is shown in U.S. Pat. No. 4,029,622. An unsaturated monomer is polymerized in a water-in-oil emulsion with later removal of a portion of the water. Only very high molecular weight polymers are utilized and a water-soluble wetting agent is necessary to form a stable dispersion.

Accordingly, it is seen that the widespread use of water-miscible or water-soluble vehicles for suspending a water-soluble polymer in a concentrate to permit a rapid dissolution of the polymer in water has engendered certain problems. The vehicles tend to be expensive. Further, owing to their miscibility with water, these are not readily recovered from aqueous solutions after use. Attempts to employ non-water-miscible solvents to disperse water-soluble polymers have succeeded, only when oil-in-water or water-in-oil emulsions were employed or specialty chemicals were additionally employed.

Therefore, there exists a need for a rapidly dissolving concentrate containing a water-soluble polymer employing an inexpensive dispersion vehicle which is recoverable from the aqueous solution of polymer, if desired.

The above and other objects are attained in a stable, nonaqueous composition adapted to provide, upon dilution with water, a solution containing a high molecular weight water-soluble polymer, comprising:

(a) a particulate water-soluble polymer.

(b) a water-insoluble, organic liquid vehicle which is a non-solvent for said particulate polymer in sufficient amounts to coat said particulate polymer.

(c) an inert, nonionic surfactant agent compatible with said organic vehicle in sufficient amounts to remove said organic liquid vehicle coating on said particulate polymer upon dilution with water, preferably an nonionic surfactant agent having a hydrophilic-lipophilic balance (HLB) in the ranges of 3–5 and 9–13, and, (d) an inert thickening agent in amounts from about 0% to 5% by weight of said composition to retard stratification of said composition when fluidized.

By way of explanation, the water-insoluble vehicle coats the polymer particles in a hydrophobic sheath. The nonionic surfactant agent (surface active) is compatible with the insoluble vehicle. When the composition is added to water the surfactant carries the hydrophobic sheath or coating from the polymer particles at the proper rate to free the particles: each particle, therefore, has an opportunity to separate from each other upon addition to water and dissolve therein.

When the composition is formed in a fluid state, the inert thickener retards the settling of the normally more dense polymer from the normally less dense insoluble vehicle.

The insoluble vehicles employed can be petroleum based hydrocarbon vehicles as mineral oils, kerosenes or naphthas. Such vehicles are inexpensive and are water insoluble. Generally, they may be recovered as a layer floating on the aqueous polymer solution after dissolution.

When prior art hydrophilic water-miscible or water-soluble vehicles are employed to disperse water-soluble polymers, upon addition of water, the polymer particles separate. Next, water penetrates the water-miscible or water-soluble coating on each particle. Rapid swelling and hydration of the particles occurs. The coating eventually is dissolved. The prior art does not deal with removal of a hydrophobic coating from the polymer upon addition to water. Emulsifiers employed in the prior art are adapted to stabilize the prior art water-in-oil dispersions of needed polymer or to aid in reducing viscosity of slurries. They are not employed to remove hydrophobic coatings from polymer particles upon addition to water.

The particulate water-soluble polymers of the invention include those having average molecular weights of about 100,000 to 20 million. Typically they include polymers and copolymers of acrylamide such as, for example, acrylamide-acrylic acid, acrylamide-methacrylic acid and the water-soluble salts of acrylic and/or methacrylic acid containing about 5–95% by weight, acrylamide. Other useful copolymers of acrylamide are formed with other vinyl monomers, including maleic anhydride, acrylonitrile, styrene and the like.

Additional water-soluble polymers employed in the present invention include polystyrene sulfonates, water-soluble cellulose derivatives, particularly hydroxypropyl cellulose and hydroxyethyl cellulose, hydroxyalkyl alkali metal carboxyalkyl cellulose derivatives, and free acid hydroxyalkyl carboxyalkyl cellulose derivatives, including hydroxyethyl carboxymethyl cellulose, hydroxymethyl carboxyethyl cellulose, hydroxymethyl carboxymethyl cellulose, hydroxypropyl carboxymethyl cellulose, hydroxypropyl carboxyethyl cellulose, hydroxypropyl carboxyethyl cellulose, hydroxypropyl carboxypropyl cellulose, hydroxybutyl carboxymethyl cellulose, and the like. The preferred alkali metal salts of these hydroxyalkyl carboxyalkyl celluloses are the sodium and the potassium salts.

Still other useful polymers include polyvinyl pyrrolidone, polycarboxylic acid derivatives, polyvinyl methyl ether and the like. Examples of such compounds are polyacrylic acid derivatives, alginic acid derivatives and the like.

Preferably, the above-mentioned polymers have an average molecular weight at least about 100,000. The preferred average particle size of such polymers is from about 0.01 microns to 1000 microns.

The concentration of such water-soluble polymers in the nonaqueous compositions of the invention may be varied over a broad range. As little as 1% by total weight of formulation of polymer may be employed, although the dilute character of the system at this loading requires a large storage capacity. Amounts as large as 99 weight percent of polymer can be utilized. In general, it is preferred to employ from about 10 to 99 weight percent of polymer.

The preferred polymer is an ethylene oxide polymer, especially a homopolymer of ethylene oxide. The ethylene oxide polymers include, copolymers of ethylene oxide with one or more polymerizable olefin monoxide comonomers. Since the ethylene oxide copolymers must be water-soluble, a limitation is placed on the amount of olefin oxide comonomer that can be contained in such polymers. The olefin oxide comonomers have a sole vicinal epoxy group i.e.:

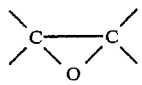

group, and they are illustrated by 1,2 propylene oxide, 2,3 butylene oxide, 1,2-butylene oxide, styrene oxide, 2,3 epoxy hexane, 1,2 epoxy octane, butadiene monoxide, cyclohexene monoxide, epichlorohydrin, and the like. Desirable water-soluble ethylene oxide polymers include copolymers of ethylene oxide with butylene oxide, and/or styrene oxide and, for example, copolymers which contain upwards to about 15 weight percent of the olefin oxide comonomers. It should be noted that the term "copolymer" is used in its generic sense, that is, a polymer formed via the polymerization of two or more polymerizable monomers. The preparation of the ethylene oxide polymers is well documented in the literature, e.g.; U.S. Pat. Nos. 2,969,403, 3,037,943 and 3,167,519.

A preferred homopolymer of ethylene oxide has an average molecular weight greater than about 100,000 and more preferably has an average molecular weight between 100,000 and 500,000 and a solid density of about 1.15 to 1.26. The average particle size of the polymer is from about 0.01 microns to 1000 microns and preferably from about 50 to 250 microns.

The concentration of the preferred water-soluble polymers contained in the novel systems of the present invention can be varied over a wide range. The minimum limit can be as low as one weight percent, and lower, based on the total formulation weight. At such low concentrations, however, the dilute character of the system requires large storage capacity which limits applicability. On the other hand, loadings as high as 99 weight percent polymer can be used. Polymer loadings in low concentration ranges are fluids, while those in high concentration ranges are easily flowable powders. Preferably polymer concentrations are in the range from about 10% to 99%.

A water-insoluble, organic liquid vehicle which is a non-solvent for said particulate polymer is employed to coat said polymer with a hydrophobic sheath. Such fluids include liquid hydrocarbons such as aliphatic hydrocarbon liquids. Particularly preferred hydrocarbons are petroleum based liquid hydrocarbons, as mineral oils, kerosenes, diesel fuels, naphthas. Enhanced results are attained and accordingly, it is preferred to employ refined paraffin and naphthenic hydrocarbons, commonly known as mineral oils. Especially preferred mineral oils are those blends having between about 35 to 41% naphthenes and 65 to 59% paraffins with an average molecular weight about 365. The flash point of such oils is usually from about 360°–365° F. and their viscosity range is from about 19 to 32 cP.

Also preferred are branched chain isoparaffinic solvents, such as those having a flash point on the order of 142° F. and an average molecular weight of about 170.

Other preferred water-insoluble liquid vehicles which are non-solvents for said water-soluble polymers include liquid propylene oxide polymers which are butanol started or dipropylene glycol started. Typically, the butanol started liquid propylene oxide polymers have a viscosity on the order of 285 Sabolt Universal Seconds at 100° F. Such compounds are well-known and commercially available.

In general the concentration of the water-insoluble, solvent fluid which is a non-solvent for the polymer in the non-aqueous composition is from about 5% to 99% by total weight of the formulation. The particular concentration selected will vary depending upon the polymer concentration selected and the concentration of emulsifying agent required to produce effective dissolution upon addition of said formulation to water.

The nonionic surfactant agent employed as the emulsifier must be inert and compatible with the organic vehicle. The surfactant agent preferably has a hydrophilic-lipophilic balance (HLB) with the range from HLB 3–5 or HLB 9–13, although surfactants having HLB values other than 3–5 and 9–13 may be used depending on the organic vehicle selected. The term "HLB" is well-known to the art and is explained in detail in the publication "THE ATLAS HLB SYSTEM", published in 1971 by Atlas Chemical Industries. Within the lower preferred HLB range from 3–5, water-in-oil type emulsions are formed with, for example, mineral oil upon addition of the non-aqueous concentrate to water. Within the upper preferred HLB range from 9–13, oil-in-water emulsions of, for example, mineral oil and kerosene, are formed. Surfactant agents having HLB values beyond these ranges may be utilized to effectively remove other hydrophobic organic liquid vehicles from the particulate water-soluble polymer upon dissolution by proper selection of the surface active agent employed.

It is important to provide the nonaqueous composition of the invention with balanced emulsification properties, i.e., to select the surfactant agent having the HLB value for the organic vehicle which employed. If the surfactant agent has too low an HLB the hydrophobic coating will be readily emulsified. The use of a surface active agent having too low an HLB retards dissolution of the polymer particles to such an extent that the polymer particles will aggregate and clump. If the surfactant agent has too high an HLB, the surfactant will remove the hydrophobic coat too rapidly and the overall effect would be akin to adding the particulate polymer to water by itself.

Accordingly, the nonionic surfactant agents employed include an emulsifier or a blend of emulsifiers compatible with the non-water-soluble vehicle. The surfactant agent may be soluble in the vehicle or it may form a stable colloidal dispersion in the vehicle.

To achieve the needed HLB blend, organic emulsifiers, such as polyhydric alcohol esters of long-chain fatty acids, may be employed. Hydrophobic esters of lower polyhydric alcohols, as glycerine, as well as hydrophilic esters of higher polyols or ether-alcohols may also be employed. Such compounds are well-known in the art.

Preferred emulsifiers are ethoxylated long-chain fatty acids, sorbitan fatty acid esters and monoglycerides or diglycerides and mixtures thereof. Useful glycerides include glycerol monostearate (HLB 11), and mono and diglycerides from glycerolysis of edible fats (HLB 3.5). Particularly preferred emulsifiers are blends of sorbitan fatty acid esters, known as Spans and polyoxyethylene sorbitan fatty acid esters, known as Tweens; having a resultant HLB from 3–5 or from 9–13.

The following sorbitan fatty acid esters (A) may be combined with any of the following polyoxyethylene sorbitan fatty acid esters (B) in appropriate concentrations to provide the surfactant agent of the invention:

| (A) | (B) |
|---|---|
| Sorbitan monolaurate | Polyoxyethylene sorbitan monolaurate |
| Sorbitan monostearate | |
| Sorbitan sesquioleate | Polyoxyethylene sorbitan monopalmitate |
| Sorbitan trioleate | Polyoxyethylene sorbitan tristearate |
| Sorbitan monopalmitate | |
| Sorbitan monostearate | Polyoxyethylene sorbitan trioleate |
| Sorbitan tristearate | |

Other emulsifiers including polyoxyethylene alcohols, such as polyoxyethylene lauryl ether, polyoxyethylene stearyl ether and polyoxyethylene oleyl ether may be employed.

The emulsifiers are employed in the nonaqueous composition in amounts from about 0.1 to 20% by weight of total formulation although greater or smaller amounts can be employed. Preferably the emulsifiers are employed in concentrations from about 1 to 10% by weight. The particular concentration to be employed is dependent, in part, on the nature of the water-soluble polymer, its concentration, and the nature of the emulsifying agent itself. Similarly, the emulsifier selected is dependent upon the above factors and appropriate selections are to be made in view of the above, by those skilled in the art.

Particularly preferred emulsifiers include the following blends at the following weight ratios:

| | | | |
|---|---|---|---|
| (I) | sorbitan monooleate polyoxyethylene (20) sorbitan monooleate | $\frac{3}{7}$ | HLB = 11.3 |
| (II) | sorbitan trioleate polyoxyethylene (20) sorbitan trioleate | $\frac{0.84}{0.16}$ | HLB = 3.3 |
| (III) | sorbitan tristearate polyoxyethylene (20) sorbitan tristearate | $\frac{0.88}{0.22}$ | HLB = 3.1 |
| (IV) | sorbitan monostearate polyoxyethylene (20) sorbitan monostearate | | HLB = 8.5 |
| (V) | sorbitan trioleate polyoxyethylene sorbitan trioleate | $\frac{0.62}{0.38}$ | HLB = 5.3 |

Blend (I) provides especially enhanced results and is, accordingly, most preferred. The preferred blends and other surfactants are employed in concentrations from about 1 to 5% by weight of formulation.

The thickening agent is employed, inter alia, to increase the viscosity of the organic liquid vehicle to retard the tendency of the dispersed water-soluble polymer to settle out and stratify. For many purposes it is unnecessary that the formulation of the invention be storage stable over extended periods of time. In general it is desirable to have the formulation only at least sufficiently stable that it may be readily redispersed.

The thickener is necessary when the formulation of the invention is in a fluid state; that is when the concentration of water-soluble polymer is less than about 70% and usually less than about 45% by weight of formulation. For higher concentrations of polymer above about 70%, use of the thickener is discretionary. At such higher concentrations and thickener aids in stabilizing the hydrophobic coating on the polymer.

Examples of typical thickening agents include colloidal silica, colloidal silica-alumina mixtures, chrysotile asbestos, colloidal clays, such as montmorillonite, modified clays of the magnesium aluminum silicate mineral types, microcrystalline asbestos, and microcrystalline nylon.

Preferred thickeners include finely divided silica, such as precipitated silica, fumed silica and the like. The commercial Cab-O-Sil (by Cabot) fumed silica is especially preferred.

Additional preferred thickeners include metallic soaps, such as the metal salts of higher monocarboxylic organic acids, as stearates, laurates and oleates. Typical metal cations for said soaps include aluminum, calcium, iron, lead, lithium, magnesium, sodium and zinc. Most preferred soaps are the stearates, especially aluminum stearate.

In general the thickeners are employed in minor amounts usually between 0.1 and 5% by weight of formulation. Most preferably the thickeners are employed in amounts from about 0.5 to 3% by weight and, for the fumed silica in amounts from about 1 to 2% by weight.

Other conventional additives may be employed in such formulations depending, in part, upon the end use which the formulation is designed. For example, the formulation may include stabilizers to arrest possible degradation of the water-soluble polymers. Such stabilizers must be inert to the components of the composition of the invention and can include ultraviolet screening agents, antioxidants and the like. Additionally, such additives as dyes or corrosion inhibitors could be employed as desired.

The nonaqueous slurries of the present invention have been found to be particularly useful as lubricants when dissolved in aqueous solutions. Additional uses for the compositions of the invention have been discussed hereinbefore.

In order to prepare the non-aqueous water-soluble polymer containing formulations of the invention the water-insoluble vehicle is blended with the surfactant agent under agitation. Shortly thereafter, the thickening agent is slowly added and the resulting mixture is stirred for about five minutes. Next, the stirred mixture is blended by high shear mixing for a period of about five minutes until a homogeneous dispersion is obtained. Finally the particulate, water-soluble polymer is blended with the dispersion under high shear conditions for about 10 minutes until a homogeneous slurry is obtained. When metallic soap thickeners are employed it is preferable to heat the blend of insoluble vehicle, surfactant and soap until the soap dissolves during processing.

In order to demonstrate the rapid dissolution of the present formulations as compared to addition of polymer directly to water, the following slurries were prepared in accordance with the aforesaid preparation procedures and the following specific slurry preparation procedure:

PREPARATION OF SLURRY 1

1447 grams of the mineral oil sold under the Trademark Sontex 150 by Marathon Morco Co., flash point in (COC) 365° F. (72.35%) was blended with 20 grams (1%) of a blend of Tween 80/Span 80 (7/3 ratio). 33 grams of Cab-O-Sil M-5 (Trademark of Cabot Corp.) (1.65%) fumed silica was added and the mixture stirred at 70 rpm for 5 minutes followed by high shear mixing with a Cowles Dissolver. Mixing was accomplished with a 3" diameter blade set at 1.25" from the container bottom. The blade rotated at 2000 rpm for 5 minutes. Three hundred grams of the above mixture was then mixed with 100 grams (25%) of the poly (ethylene oxide) sold under the Trademark POLYOX WSRN-3000* by Union Carbide Corp. and mixed under high shear, using the Cowles Dissolver for 10 minutes at 2000 rpm.

*POLYOX designates a Trademark of Union Carbide Corporation.

The following Trademarks correspond to the corresponding products as follows:

| Trademarks | Compositions | HLB |
|---|---|---|
| Span 65 (ICI-U.S.) | Sorbitan tristearate | 2.1 |
| Span 80 (ICI-U.S.) | Sorbitan monooleate | 4.3 |
| Span 85 (ICI-U.S.) | Sorbitan trioleate | 1.8 |
| Tween 65 (ICI-U.S.) | Polyoxyethylene (20) sorbitan tristearate | 10.5 |
| Tween 80 (ICI-U.S.) | Polyoxyethylene (20) sorbitan monooleate | 15 |
| Tween 85 (ICI-U.S.) | Polyoxyethylene (20) sorbitan trioleate | 11 |
| UCONLB250 (Union Carbide Corp.) | butanol started poly(propylene oxide) polymer | |
| PPG1025 (Union Carbide Corp.) | dipropylene glycol started poly(propylene oxide) polymer | |

| Polymer - Trademark | Chemical Composition | |
|---|---|---|
| POLYOX Resin WSRN-3000 (Union Carbide Corporation) | $H-(OCH_2CH_2)_x-OH$ | High molecular weight poly (ethylene oxide) M.W. about 400,000 |
| Klucel H (Hercules) | Hydroxypropyl cellulose (molar substitution 3.0) | 900,000 molecular wt. |
| Cellulose Gum CMC-7MF (Hercules) | Sodium carboxymethyl cellulose (degree of substitution 0.7) | |
| Separan MGL (Dow Chemical Co.) | Nonionic polyacrylamide high molecular weight | |
| Separan MG700 (Dow Chemical Co.) | Anionic polyacrylamide - very high molecular weight | |

To further illustrate the advantages and properties of the invention, the following nonaqueous compositions of the invention were prepared as follows wherein the weights are based on the total weight of the formulation:

TABLE I

| Slurry 1 | POLYOX WSRN 3000 | 25% |
|---|---|---|
| | Span 80/Tween 80 (3/7) | 1% |
| | CAB-O-SIL M-5 | 1.65% |
| | Sontex 150 | 72.35% |
| Slurry 2 | POLYOX WSRN 3000 | 25% |
| | CAB-O-SIL M-5 | 1.65% |
| | Sontex 150 | 73.35% |
| Slurry 3 | Klucel H | 25% |
| | Span 80/Tween 80 (3/7) | 1% |
| | CAB-O-SIL M-5 | 1.65% |
| | Sontex 150 | 72.35% |
| Slurry 4 | CMC 7H | 25% |
| | Span 80/Tween 80 (3/7) | 1% |
| | CAB-O-SIL M-5 | 1.65% |
| | Sontex 150 | 72.35% |
| Slurry 5 | Separan MGL | 25% |
| | Span 80/Tween 80 (3/7) | 1% |
| | CAB-O-SIL M-5 | 1.65% |
| | Sontex 150 | 72.35% |
| Slurry 6 | Separan MG 700 | 25% |
| | Span 80/Tween 80 (3/7) | 1% |
| | CAB-O-SIL M-5 | 1.65% |
| | Sontex 150 | 72.35% |
| Slurry 7 | Separan MG 700 | 25% |
| | Span 85/Tween 85 (.22/.78) HLB 9 | 1% |
| | CAB-O-SIL M-5 | 1.65% |
| | Sontex 150 | 72.35% |
| Slurry 8 | POLYOX WSRN 3000 | 25% |
| | Span 80/Tween 80 (3/7) | 1% |
| | Aluminum Stearate* | 1.65% |

TABLE I-continued

| | | |
|---|---|---|
| Slurry 9 | Sontex 150 | 72.35% |
| | POLYOX WSRN 3000 | 25% |
| | Span 80/Tween 80 (3/7) | 1% |
| | CAB-O-SIL M-5 | 1.65% |
| | UCON LB250 | 72.35% |
| Slurry 10 | POLYOX WSRN 3000 | 25% |
| | Span 80/Tween 85 | 1% |
| | CAB-O-SIL M-5 | 1.65% |
| | PPG 1025 | 72.35 |
| Slurry 11 | POLYOX WSRN 60K | 70% |
| | Span 85/Tween | |
| | (.84/.16) HLB 3.3 | 5% |
| | Sontex 150 | 25% |

*An aluminum stearate sold under the Trademark Aluminum Stearate No. 22 by Witco Chemical Co.

The aforesaid slurries were prepared in accordance with the aforesaid slurry preparation procedures. To further illustrate the advantages and properties of the formulations of the invention a series of comparative tests were run. The tests illustrate certain preferred embodiments of the invention and are not limitative of scope.

WATER-SOLUBLE POLYMER DISSOLUTION TEST—(BOILING WATER TEST)

This is a standard test to obtain complete dissolution of poly(ethylene oxide). Distilled water is brought to a vigorous boil on a hot plate. The required amount of boiling water is then quickly weighed into a clean beaker and rapidly stirred to form a vortex. The required amount of poly(ethylene oxide) resin is gently shaken into the solution. As the vortex decreases due to solution thickening, mixing speed is increased. Upon complete polymer addition mixing speed is decreased to about 50 rpm and the solution is stirred for 1 to 2 hours. After cooling to room temperature, the solution stands overnight and viscosity is then measured.

STANDARD SLURRY DISSOLUTION TEST

The object of this test is to determine if a slurry of water-soluble polymer will dissolve easily at room temperature and result in a homogeneous solution without the formation of undissolved polymer lumps. Viscosity of the aqueous solution is measured after various mixing times. A typical example is as follows:

Into a 400 ml high form beaker, 200 ml of distilled water is added. Using a variable speed lab stirrer set at 60 rpm, with a three blade, 2 inch diameter propeller, a vortex is formed. To form a 0.5% polymer solution, for example, 4 g of 25% polymer slurry is rapidly added (less than 5 sec.) and the solution stirred for 15 minutes. Twenty-five ml of solution is withdrawn by a pipette from the bottom of the beaker, while stirring. Viscosity is measured with a Brookfield Synchro-Lectric Viscometer and an UL adapter attachment at 60 rpm. Observation of degree of solution homogeneity is also made.

COMPARATIVE EXAMPLE 1

Using the boiling water technique described hereinbefore in the Water-Soluble Polymer Dissolution Test, a 0.5% poly(ethylene oxide) (POLYOX WSRN 3000) (molecular weight about 400,000) solution was prepared with a viscosity of 4.8 cP. This example demonstrates the viscosity of a well dissolved 0.5% solution in a water-soluble ethylene oxide polymer of the invention.

COMPARATIVE EXAMPLE 2

This example demonstrates that simple, rapid addition to water at room temperature does not achieve rapid polymer dissolution. The polymer is, in this example, sifted in over approximately 0.5 minute (without boiling of the 0.5% solution of Comparative Example 1). Listed below are solution viscosities for various mixing times.

| Mixing Time, min | Viscosity, cP | Solution Appearance |
|---|---|---|
| 2 | 2.8 | lumps visible |
| 5 | 4.0 | for up to |
| 10 | 4.2 | 15 minutes |
| 15 | 5.0 | |
| 20 | 5.1 | |
| 25 | 5.1 | |

COMPARATIVE EXAMPLE 3

This example demonstrates the significant improvement in dissolution rate achieved when a water-soluble polymer of the invention is rapidly added (less than 5 seconds) in a nonaqueous slurry of the present invention. Using Slurry 1, illustrated in Table I to prepare a 0.5% solution, the solution viscosity for various times is listed below.

| Mixing Time, min | Viscosity, cP | Solution Appearance |
|---|---|---|
| 1 | 5.2 | No lumps |
| 2 | 5.3 | No lumps |
| 5 | 5.4 | No lumps |
| 15 | 5.5 | No lumps |

COMPARATIVE EXAMPLE 4

This example demonstrates that a 2% ethylene oxide polymer solution (POLYOX WSRN 3000) employed alone, without the nonaqueous slurry of the present invention is also quite difficult to prepare by simple rapid (sifted in over approximately 0.5 minutes) addition to water. The addition was conducted in accordance with Comparative Example 2.

| Mixing Time, min | Viscosity, cP | Solution Appearance |
|---|---|---|
| 2 | 20.1 | |
| 5 | 34.4 | Many lumps |
| 10 | 50.7 | |
| 15 | 58.2 | |
| 30 | 65.5 | |
| 40 | 68.5 | No lumps |
| 50 | 70.9 | |
| 60 | 71.0 | |

COMPARATIVE EXAMPLE 5

This example is conducted in accordance with the procedure of Comparative Example 3 employing Slurry 1 and demonstrates that rapid addition (less than 5 sec.) of a nonaqueous slurry of the invention significantly improves the dissolution rate of the water-soluble ethylene oxide polymers of the invention at a higher concentration of 2%. The test results show marked improvement over the solution appearance in Comparative Example 4.

| Mixing time, min | Viscosity, cP | Solution Appearance |
|---|---|---|
| 2 | 65.5 | |
| 5 | 67.5 | |
| 10 | 72.0 | No lumps |
| 15 | 72.0 | |
| 20 | 72.0 | |

COMPARATIVE EXAMPLE 6

This example demonstrates that an ethylene oxide polymer (POLYOX WSRN 3000) slurry prepared without an emulsifying surfactant agent of the invention has very poor dissolution properties. These test results illustrate that an emulsifying surfactant agent of the invention must be employed in order to achieve rapid dissolution of the water-soluble polymer.

Slurry 2 of Table I (absent a surfactant agent) was rapidly added (less than 5 seconds) to water and results are shown below for the addition of a 0.5% solution.

| Mixing time, min | Viscosity, cP | Solution Appearance |
|---|---|---|
| 1 | not measurable | Large lumps present |
| 2 | accurately due to | Large lumps present |
| 5 | lump presence | Large lumps present |
| 15 | | Some small lumps |

The poor dissolving properties of the composition of Example 6 are clearly evident by the presence of large lumps. Under such conditions, normal rotation of fluid is hindered within the narrow annular space of the coaxial cylinder viscometer used to measure viscosity.

When the results of Comparative Example 6 are compared with the results of Comparative Example 3, wherein a surfactant is employed, it becomes evident that the dissolution rate is significantly improved by the addition of the appropriate amount and type of emulsifying surfactant agent. Similar results are obtained when other water-soluble polymers specified herein are formulated with other surfactant agents of the invention.

COMPARATIVE EXAMPLE 7

This example demonstrates the difficulty of preparing a 1% solution of a very high molecular weight ethylene oxide polymer of the invention (POLYOX Resin WSRN 60K). This polymer has an average molecular weight of about 2,000,000. Dissolution is attempted by simple rapid addition (less then 5 seconds) of the powder to water. The below test results demonstrate the poor dissolution properties exhibited by the powder addition technique.

| Mixing time, min | Viscosity, cP* | Comment |
|---|---|---|
| 5 | 11.5 | One big lump on |
| 10 | 13 | initial addition - |
| 15 | 13.5 | no change with |
| 25 | 15.5 | time. |

*Viscosity as measured by Brookfield Viscometer LV-2, 60 rpm.

Using the boiling water technique discussed hereinabove, a 1% solution of ethylene oxide polymer, M.W. 2,000,000, is dissolved in water. The resultant solution has a viscosity of 271 cP. This technique illustrates the viscosity of a well-dissolved polymer. The following illustrative examples demonstrate the enhanced results obtained beyond those of Example 7 when various formulations of the invention are added to water as compared to simple dry powder addition using the boiling water technique.

EXAMPLE 8

Slurry 11 of Table I was added as a 1% solution to water. This "slurry" is actually a free flowing semi-solid powder. No thickener was necessary since the formulation was not in a fluid state. Upon rapid addition (less than 5 seconds) to water the following results were obtained.

| Mixing time, min | Viscosity, cP | Comment |
|---|---|---|
| 5 | 142.5 | |
| 10 | 181.5 | 6 Very small |
| 15 | 190 | lumps |
| 25 | 205.5 | |

EXAMPLE 9

This example demonstrates the enhanced results imparted by employing aluminum stearate as a thickener. A 0.5% solution of Slurry 8 of Table I was added to water. The results, when compared to Comparative Example 2, illustrate the superiority of the inventive composition.

| Mixing time, min | Viscosity, cP | Solution Appearance |
|---|---|---|
| 5 | 5.5 | No lumps - |
| 10 | 6.5 | |
| 15 | 6.5 | easy to dissolve |
| 25 | 6.5 | |

EXAMPLE 10

This example demonstrates that UCON LB250, a butanol started poly(propylene oxide)polymer, is effective as a water-insoluble, solvent vehicle. The test results below show that by using Slurry 9 of Table I, a 0.5% solution can be rapidly formed.

| Mixing time, min | Viscosity, cP | Solution Appearance |
|---|---|---|
| 5 | 5.8 | No lumps - |
| 10 | 6.0 | easy |
| 15 | 6.0 | dissolving |
| 25 | 6.0 | |

EXAMPLE 11

This example demonstrates that a dipropylene glycol started poly (propylene oxide) polymer available under the Trademark PPG 1025 from Union Carbide Corp. is effective as a water-insoluble solvent vehicle of the invention. The test results show that by using Slurry 10 of Table I a 0.5% solution can be rapidly formed.

| Mixing time, min | Viscosity, cP | Solution Appearance |
|---|---|---|
| 5 | 6.1 | No lumps - |
| 10 | 6.5 | easy |
| 15 | 6.6 | dissolving |

The following examples clearly demonstrate that compositions of the present invention are useful for rapidly dissolving a variety of other high molecular weight water soluble polymers, as well as poly(ethylene oxide).

A hydroxypropyl cellulose available under the Trademark Klucel H from Hercules is typical of most water-soluble polymers which have a tendency to agglomerate or lump when the dry powder is first wet with water. Hydration of the outer surface of a "lump" results in the formation of a viscous gel-layer which inhibits wetting of the material inside. The faster the rate of polymer hydration, the more quickly will the gel-layer be developed and the greater the tendency for undesirable lumping. Although Klucel hydrates somewhat slowly, lump formation can occur unless special complicated techniques are employed, such as slurrying the powder in a water soluble non solvent for the powder, such as hot water (T>50° C.), then diluting with cold water.

EXAMPLE 12

The data below compare the viscosity vs. mixing time for a 0.5% (Klucel H) solution prepared by slow addition of the dry polymer into room temperature water compared to rapid addition of Slurry 3, of Table I, prepared according to the teachings of the present invention.

| Method | Mixing time, min → | Viscosity, cP | | | | | | Comment |
|---|---|---|---|---|---|---|---|---|
| | | 5 | 10 | 15 | 25 | 30 | 35 | |
| Powder Addition | | 11 | 22 | 40 | 88 | 110 | 148 | No lumps |
| Slurry 3 | | 6 | 15 | 66 | 123 | 155 | 173 | No lumps |

EXAMPLE 13

Cellulose gum, like all water-soluble polymers, has a tendency to agglomerate or lump when first wet with water. Special techniques, such as slow addition, dispersing in water miscible swellable solvent or using a special mixing device are required to solubilize it in water.

This example demonstrates that the compositions of the present invention greatly improve the dissolving rate of sodium carboxymethyl cellulose. The data below compare the preparation of a 2% (CMC) sodium carboxymethyl cellulose solution by (i) slow addition of powder to water and (ii) by rapid addition of Slurry 4 of Table I.

| Method | Mixing time, min → | Viscosity, cP | | | | Comment |
|---|---|---|---|---|---|---|
| | | 5 | 10 | 15 | 25 | |
| Powder Addition | | 156 | 197 | 223 | 348 | Still lumps at end |
| Slurry 4 | | 363 | 369 | 371 | 371 | Homogeneous milky appearance. |

EXAMPLE 14

This example demonstrates that compositions of the present invention are superior for preparing aqueous solutions of nonionic poly(acrylamides), such as Separan MGL. Separan polymers also require special dispersing equipment for rapid dissolution. The data below compares the preparation of 0.5% Separan MGL solution by the powder addition method with the slurry technique of the present invention.

| Method | Mixing time min → | Viscosity, cP | | | | | Comment |
|---|---|---|---|---|---|---|---|
| | | 5 | 10 | 15 | 25 | 30 | |
| Powder Addition | | 10 | 12 | 15 | 22 | 25 | Particles visible at end |
| Slurry 5 (Table I) | | 11 | 20 | 30 | 43 | 50 | Easily dispersed |

EXAMPLE 15

This example demonstrates that the slurry dissolution technique is useful for preparing a 0.5% solution of an anionic poly(acrylamide), Separan MG700, employing Slurry 6 and Slurry 7 of Table I and adding to water.

| Method | Mixing time, min → | Viscosity, cP | | | | | Comment |
|---|---|---|---|---|---|---|---|
| | | 5 | 10 | 15 | 25 | 30 | |
| Powder Addition | | 137 | 215 | 281 | 308 | 310 | Easily dispersed |
| Slurry 6 | | 163 | 255 | 292 | 303 | 304 | No lumps, easily dispersed |
| Slurry 7 | | 92 | 196 | 230 | 244 | 261 | Some lumps |

It will be noted that Slurry 7 provides a less desirable result than the powder technique. To obtain better performance, the emulsifiers of Slurry 6 may be utilized in lieu of those employed in Slurry 7.

The aforesaid invention is not to be limited except as set forth in the following claims.

Wherefore we claim:

1. A stable nonaqueous composition adapted to provide, upon dilution with water, a solution containing a high molecular weight water-soluble polymer, comprising:
   (a) a particulate water-soluble polymer selected from the group consisting of poly(ethylene oxide), cellulose derivatives and mixtures thereof having an average size of from about 50 to about 250 microns,
   (b) a water-insoluble, organic liquid vehicle which is non-solvent for said particulate polymer in sufficient amounts to coat said particulate polymer,
   (c) an inert, nonionic surfactant agent compatible with said organic vehicle in sufficient amounts to remove said organic liquid vehicle coating on said particulate polymer upon dilution with water, and
   (d) an inert thickener agent in amounts from about 0.1 to about 5% by weight of said composition to retard stratification of said composition when fluidized.

2. The composition of claim 1 wherein, said water soluble polymer is an ethylene oxide polymer having an average molecular weight between 100,000 to 5,000,000 and an average size from about 50 to 250 microns; said nonionic surfactant agent has a hydrophilic-lipophilic balance (HLB) in the range of 3–5 and 9–13; and said inert thickener agent is present in an amount from about 0.1 to about 5% by weight of said composition.

3. The composition according to claim 1 wherein said water-soluble polymer is a water-soluble cellulose derivative selected from the group consisting of hydroxypropyl cellulose and hydroxyethyl cellulose, hydroxyalkyl alkali metal carboxyalkyl cellulose derivatives, hydroxyethyl carboxymethyl cellulose, hydroxymethyl carboxyethyl cellulose, hydroxymethyl carboxymethyl cellulose, hydroxypropyl carboxymethyl cellulose, hydroxypropyl carboxyethyl cellulose, hydroxypropyl carboxyethyl cellulose, hydroxypropyl carboxypropyl cellulose, hydroxybutyl carboxymethyl cellulose and mixtures thereof.

4. The composition according to claim 1 wherein said water-soluble polymer is a mixture of a poly (ethylene oxide) polymer and a cellulose derivative.

5. The composition of claim 2 where said organic liquid vehicle is a petroleum-based liquid hydrocarbon.

6. The composition of claim 2 in which the organic vehicle is a liquid propylene oxide polymer which is butanol started or dipropylene glycol started.

7. The composition of claim 2 in which the surfactant agent is selected from the group consisting of ethoxylated long-chain fatty acids, sorbitan fatty acid esters, monoglycerides or diglycerides and mixtures thereof.

8. The composition of claim 7 in which the surfactant agent is a mixture of a sorbitan fatty acid ester and a polyoxyethylene sorbitan fatty acid ester.

9. A composition of claim 2 in which the surfactant agent is employed in amounts from about 0.1 to 20% by weight of total composition.

10. The composition of claim 2 in which the composition contains less than about 45% by weight of the total composition of said water-soluble polymer.

11. The composition of claim 2 wherein the thickener is a finely divided silica.

12. A stable, nonaqueous fluidized slurry adapted to provide, upon dilution with water, a solution containing a high molecular weight water-soluble polymer consisting essentially of:
(a) a particulate water-soluble ethylene oxide polymer having an average particle size from about 50 to 250 microns and having an average molecular weight greater than about 100,000;
(b) a water-insoluble organic fluid vehicle for said polymer which is non-solvent for said ethylene oxide polymer;
(c) A nonionic surfactant agent comprising a mixture of at least one sorbitan fatty acid ester and at least one polyoxyethylene sorbitan fatty acid ester, said mixture having a hydrophilic-lipophilic (HLB) balance in the ranges of 3–5 and 9–13, said surfactant agent in sufficient amounts to remove said liquid hydrocarbon from said polymer upon dilution with water; and,
(d) an inert thickener in sufficient amounts to retard stratification of said fluidized slurry; said slurry being readily dispersible in water to enable the ready preparation of an aqueous solution of said particulate ethylene oxide polymer.

13. The fluidized slurry of claim 12 wherein the ethylene oxide polymer is a homopolymer of ethylene oxide having an average molecular weight from about 100,000 to 5,000,000 and a solid density of about 1.15 to 1.26.

14. The fluidized slurry of claim 12 in which the organic fluid vehicle is a liquid petroleum based hydrocarbon.

15. The fluidized slurry of claim 14 in which the hydrocarbon vehicle is a mineral oil.

16. The fluidized slurry of claim 12 in which the surfactant agent is present in amounts from about 1 to 5% by total weight of slurry.

17. The fluidized slurry of claim 16 in which the surfactant is a mixture of sorbitan monooleate and polyoxyethylene (20) sorbitan monooleate.

18. The fluidized slurry of claim 12 in which the thickener is a fumed silica present in amounts from about 1 to 2% by weight.

19. A fluidized slurry adapted to be readily dissolved upon dilution with water consisting essentially of
(a) a particulate homopolymer of ethylene oxide having an average molecular weight between 100,000 and 5,000,000 and an average particle size from about 50 to 250 microns;
(b) a mineral oil in amounts sufficient to form said slurry with said polymer;
(c) from about 0.1 to 10% by weight of said slurry of a nonionic surfactant agent comprising a mixture of sorbitan monooleate and polyoxyethylene (20) sorbitan monooleate having a hydrophilic-lipophilic balance (HLB) between 9 and 13; and
(d) a thickener in sufficient amounts to retard stratification of said fluidized slurry, said slurry being readily dispersible in water to enable the ready preparation of an aqueous solution of said ethylene oxide hompolymer.

20. The slurry of claim 19 in which the thickener is a fumed silica.

21. The slurry of claim 19 in which the thickener is a metal salt of a higher monocarboxylic organic acid.

22. The composition of claims 1, 3, or 4 wherein said water-soluble polymer has an average molecular weight of at least about 100,000 and an average particle size of from about 50 microns to 250 microns; said organic liquid vehicle has a hydrophilic-lepophilic balance (HLB) in the range of 3–5 and 9–13; and said thickener agent is present in an amount from about 0.1 to about 5 percent by weight of said composition.

23. The composition of claim 3 or 4 wherein said organic liquid vehicle is a petroleum-based liquid hydrocarbon.

24. The composition of claim 3 or 4 in which the organic vehicle is a liquid propylene oxide polymer which is butanol started or dipropylene glycol started.

25. The composition of claim 3 or 4 in which the surfactant agent is selected from the group consisting of ethoxylated long-chain fatty acids, sorbitan fatty acid esters, monoglycerides or diglycerides and mixtures thereof.

26. The composition of claim 25 in which the surfactant agent is a mixture of a sorbitan fatty acid ester and a polyoxyethylene sorbitan fatty acid ester.

27. A composition of claim 3 or 4 in which the surfactant agent is employed in amounts from about 0.1 to 20% by weight of total composition.

28. The composition of claim 3 or 4 in which the composition contains less than about 45% by weight of the total composition of said water-soluble polymer.

29. The composition of claim 3 or 4 wherein the thickener is a finely divided silica.

* * * * *